United States Patent [19]
Korpi

[11] Patent Number: 5,517,734
[45] Date of Patent: May 21, 1996

[54] QUICK FASTENER

[76] Inventor: John G. Korpi, 14399 Ramblewood, Livonia, Mich. 48154

[21] Appl. No.: 419,655

[22] Filed: Apr. 10, 1995

[51] Int. Cl.⁶ .............................. F16B 21/00; B60D 1/02
[52] U.S. Cl. ............................................. 24/453; 280/515
[58] Field of Search .................... 24/453, 603, 606, 24/613, 614, 588, 590, 591; 411/345; 280/515; 292/257; 403/374, DIG. 6, 322, 405.1, 406.1, 407.1, 408.1

[56] References Cited

U.S. PATENT DOCUMENTS

| | | | |
|---|---|---|---|
| 3,534,650 | 10/1970 | Kubokawa | 24/453 X |
| 3,872,768 | 3/1975 | Ernst et al. | 411/345 |
| 4,086,014 | 4/1978 | Jalaguier | 24/453 X |
| 4,125,048 | 11/1978 | Hardin | 24/453 X |
| 5,048,393 | 9/1991 | Grabner et al. | 24/453 X |
| 5,199,733 | 4/1993 | Delorme | 24/453 X |
| 5,394,594 | 3/1995 | Duran | 24/453 |

*Primary Examiner*—Peter M. Cuomo
*Assistant Examiner*—Robert J. Sandy
*Attorney, Agent, or Firm*—Peter A. Taucher; David L. Kuhn

[57] ABSTRACT

A quick-attachment fastener has an elongate barrel and a plunger translatable in forward and aft directions in the barrel. A pivot pin in the barrel extends through the plunger and has an axis fixed relative to the barrel. An arm on the pin swings between a retracted position in the barrel and a deployed position where the arm extends from the barrel. An aft facing part of the plunger engages the arm so that a spring biasing the plunger urges the arm toward the deployed position. A forward facing part of the plunger opposes the arm so that aft plunger translation swings the arm to the retracted position.

9 Claims, 4 Drawing Sheets

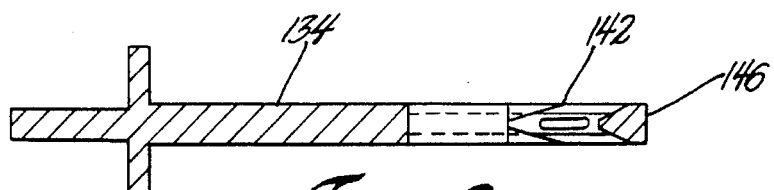
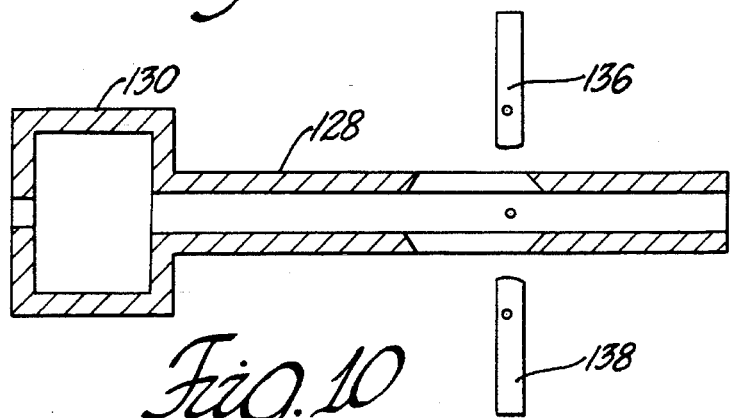
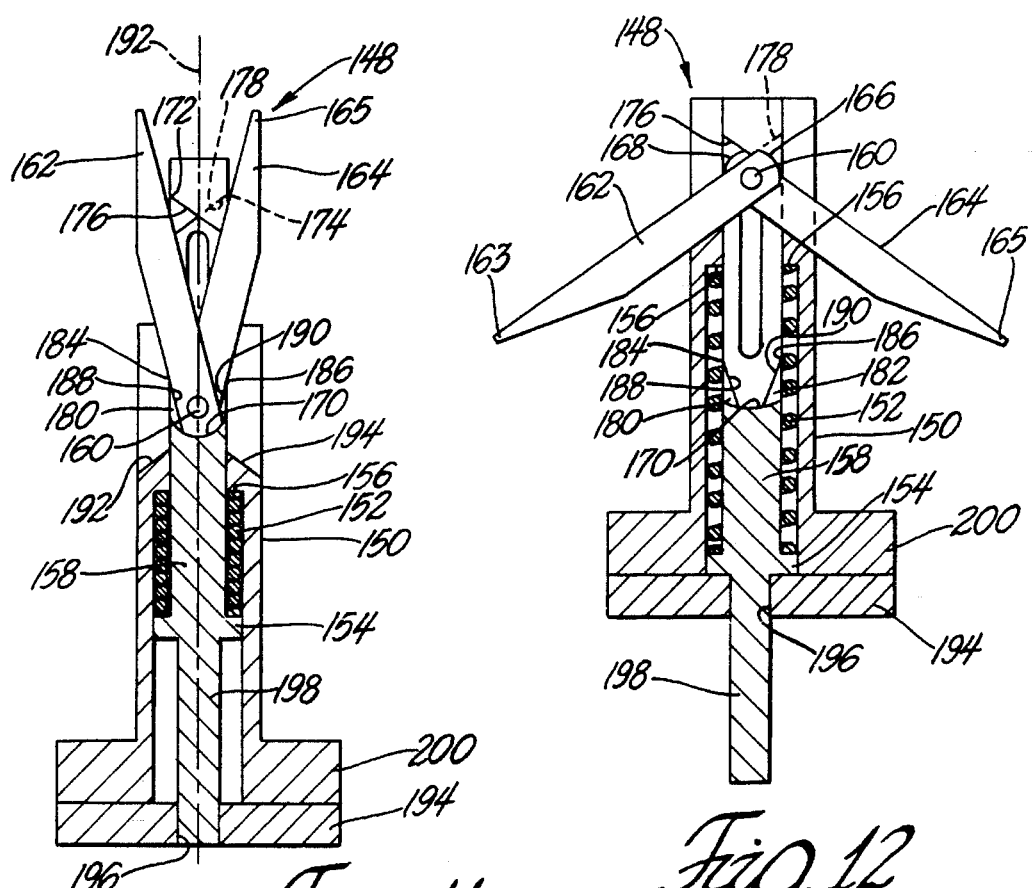

5,517,734

QUICK FASTENER

GOVERNMENT USE

The invention described here may be made, used and licensed by or for the U.S. Government for governmental purposes without paying me royalty.

BACKGROUND AND SUMMARY

My invention relates generally to fasteners. Specifically, my invention is a reusable fastener that quickly attaches one mechanical member to another and allows the members' later quick detachment.

My fastener has a tubular barrel disposed along the fastener's longitudinal axis and a plunger translatable fore and aft in the barrel. The plunger defines a flat trapezoidal through slot and a second, elongate slot intersects the trapezoidal slot. A pivot pin in the barrel extends through the elongate slot. The pin's pivot axis is fixed relative to the longitudinal axis and at least one arm swings on this pivot axis between a retracted, forward position and a deployed aft oriented position. During the retracted position no part of the arm is outside the barrel, and during the deployed position the arm extends out from the barrel. The plunger has an arm engagement portion facing aft toward the arm, and a spring biases the plunger forward; by forward motion of the plunger, the arm is urged toward the deployed position. Another, arm engagement portion of the plunger faces forward and opposes the arm. Translating the plunger aft causes this other engagement portion to swing the arm to the retracted position.

Typically, in the deployed position the arm has a tapered free or swingable end. This end fits to a barrel surface which is oblique to the longitudinal axis. In one embodiment of the fastener, the arm's free end is more rearward of the fastener than the pin during the arm's deployed position. The fastener may have a stud of the plunger passing through the fastener's aft end together with means for adjustably fixing the stud to the aft end. The fixing means comprisies a flexible plate on the aft end and a plate's edge interfering with the stud.

BRIEF DESCRIPTION OF THE DRAWINGS

FIG. 9 is a sectioned side elevational view of the plunger of the third embodiment.

FIG. 10 is a sectioned side elevational view of the barrel and retainer of the third embodiment, the arms shown separated from the barrel in the figure.

FIG. 11 is a sectioned side elevational view of a fourth embodiment of the fastener in a retracted configuration.

FIG. 12 is a sectioned side elevational view of the fourth embodiment of the fastener in a deployed configuration.

DETAILED DESCRIPTION

Figure 1:
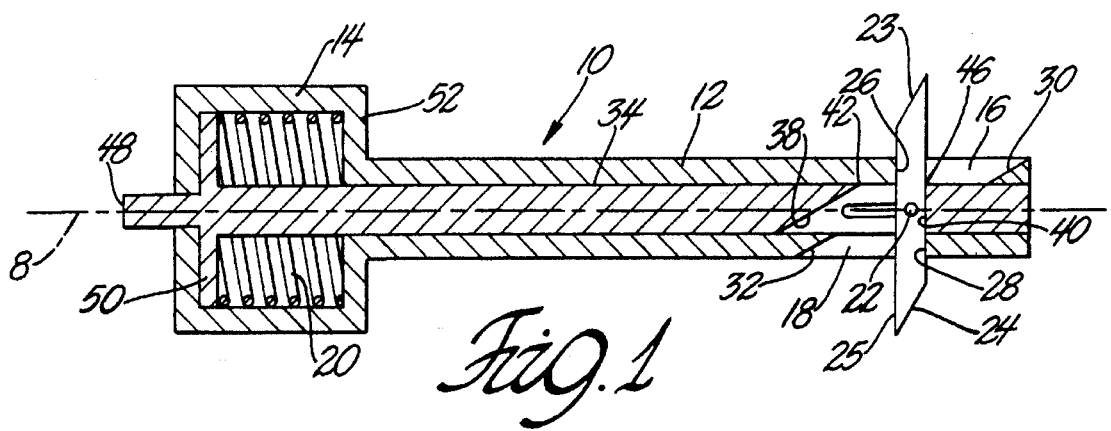
FIG. 1 is a sectioned side elevational view of a first embodiment of the fastener in a deployed configuration.

In FIG. 1 fastener 10 has a barrel 12 defining lateral openings 16 and 18, and has cylindrical container 14 enclosing coil spring 20. Journalled at the fore end of the barrel is pivot pin 22, and arm 24 pivots on pin 22. Arm 24 pivots from the FIG. 1 position (crosswise with the barrel) to the FIG. 2 position where the arm's ends are flush with the barrel's outer surface, the arm's ends 23 and 25 being tapered to facilitate their placement in flush relation to the barrel. As arm 24 goes from the FIG. 1 to the FIG. 2 position, end 23 travels from a less forward swing position to a more forward swing position. As an option, the ends can be recessed relative to the barrel's outer surface.

In FIG. 1, arm 24 contacts stop surfaces 26 and 28, which are sides of openings 16 and 18, so the arm's swing in the counterclockwise or deployment direction is limited. Arm 24 preferably contacts stop surfaces 30 and 32 of openings 16 and 18 in its FIG. 2, retracted position so as to limit arm swing toward the retracted position.

Figure 2:
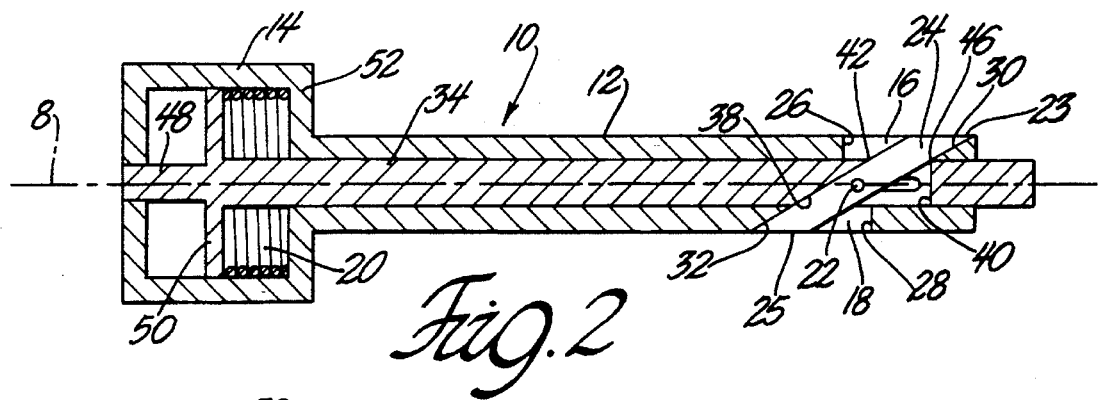
FIG. 2 is a sectioned side elevational view of the first embodiment of the fastener in a retracted configuration.
Figure 3:
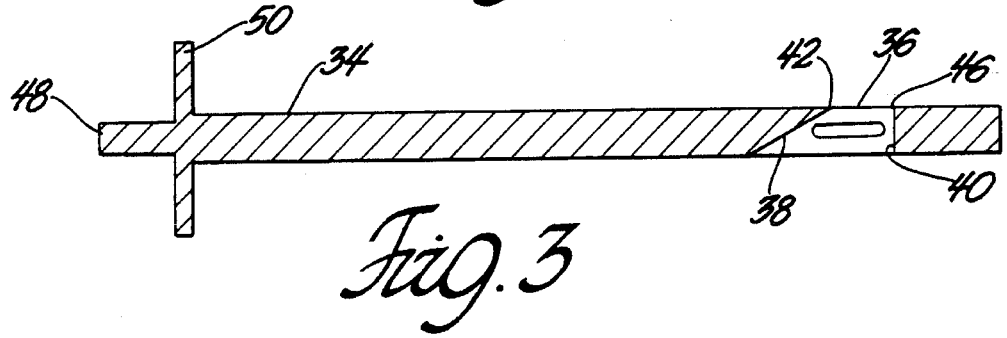
FIG. 3 is a sectioned side elevational view of the plunger of the first embodiment.
Figure 16:
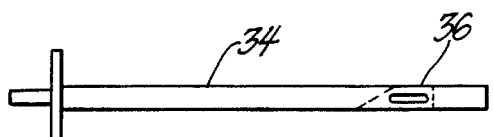
FIG. 16 is an unsectioned side elevational view of the plunger of the first embodiment of the fastener.

Inside fastener 10, plunger 34 translates along fastener longitudinal axis 8 and closely fits with barrel 12, plunger 34 being shown alone in FIGS. 3 and 16. At the fore end of plunger 34, flat trapezoidal through slot 36 has arm engagement surfaces 38 and 40 and has leading edge 42, which appears as a point in FIGS. 1 and 2. Intersecting slot 36 is oval slot 44, which accommodates pin 22 as plunger 34 translates in barrel 12. The engagement between pin 22 and slot 44 prevents rotation of plunger 34 about axis 8. When plunger 34 translates forward from its FIG. 1 position, edge 42 contacts arm 24 and swings it to the FIG. 2 position, where arm 24 faces on surface 38. In FIG. 2, surface 38 resists swing of arm 24 in both angular directions. Stop surfaces 30 and 32 form the same angle with barrel 12 as surface 38 and these stop surfaces help resist clockwise rotation of arm 24. In some applications, it may be preferred to eliminate surfaces 30 and 32 for the sake of simplicity and economy, so that clockwise resistance to arm rotation comes from surface 38 alone. When plunger 34 translates from the FIG. 2 position toward the FIG. 1 position, edge 46 of engagement surface 40 rotates arm 24 from its FIG. 2 position to its FIG. 2, deployed position.

Figure 4:
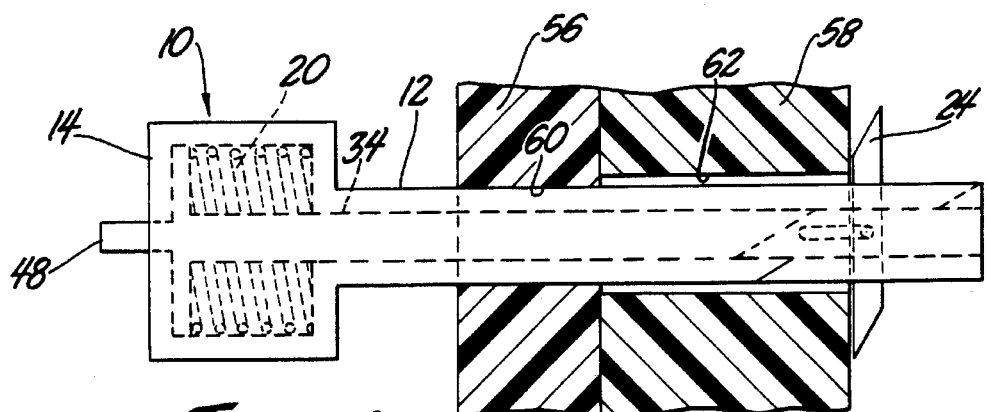
FIG. 4 is a partly sectioned view showing the first embodiment of the fastener in a position where the fastener holds two work pieces together.

At the aft end of plunger 34 are stud 48 and back plate 50. Between plate 50 and fore wall 52 is compressed a coil spring 54 that biases plunger 34 aft into container 14 and thus biases arm 24 to its FIG. 1 position. Pushing in stud 48 moves plunger 34 forward, whereby arm 24 rotates from its FIG. 1 deployed position to its FIG. 2 retracted position. FIG. 4 shows fastener 10 in a deployed position holding two members 56 and 58, the members having differently sized through holes 60 and 62.

Figure 5:
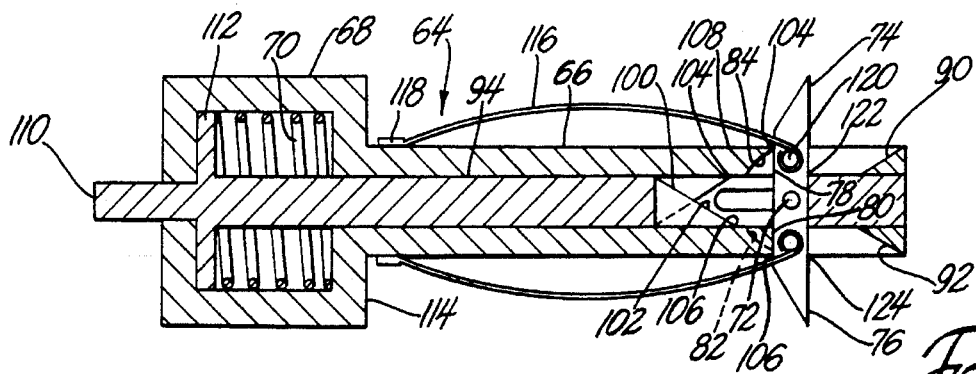
FIG. 5 is sectioned side elevational view of a second embodiment of my fastener in the deployed configuration.
Figure 6:
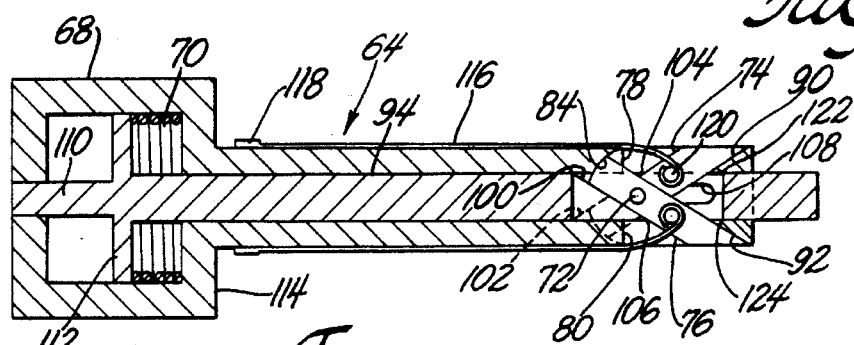
FIG. 6 is sectioned side elevational view of the second embodiment of my fastener in the retracted configuration.
Figure 7:
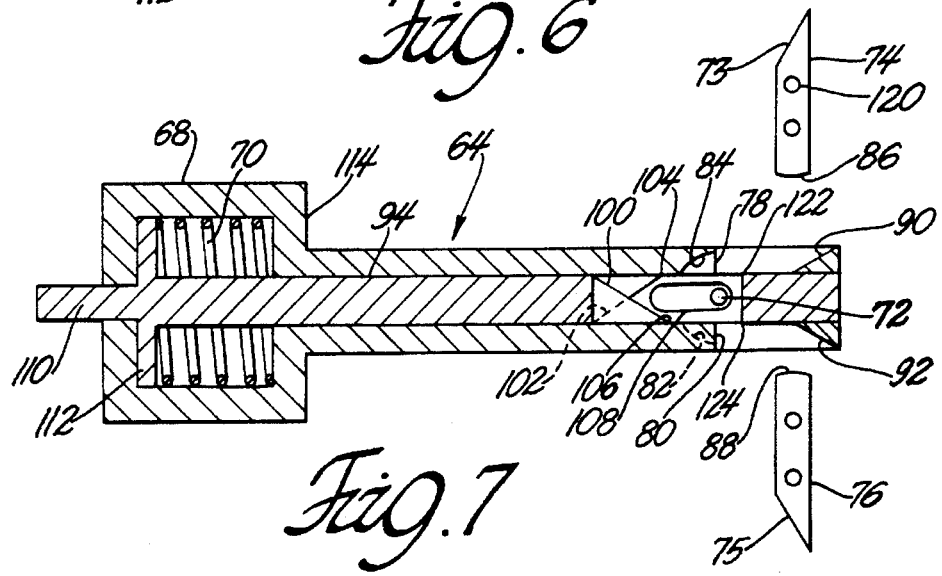
FIG. 7 is a sectioned side elevational view of the barrel and plunger of the second embodiment with arms of the fastener removed.

FIGS. 5, 6 and 7 show second embodiment 64 of my fastener whose biased double-arm arrangement replaces the first embodiment's single arm 24. Fastener 64 has barrel 66 and cylindrical container 68 enclosing coil spring 70. At the fore end of barrel 66 is pivot pin 72, and arms 74 and 76 swing on pin 72. Arms 72 and 74 pivot from the deployed position of FIG. 5 where the arms extend laterally from barrel 64 to the retracted position in FIG. 6 where the arms are flush with barrel 64. The free ends 73 and 75 (FIG. 7) of the arms are tapered so that they can more easily be made flush with barrel 66. In the retracted position, arms 72 and 74 can optionally be slightly recessed into the barrel instead of being flush therewith.

In their deployed configuration, arms 74 and 76 contact flat stop surfaces 78 and 80. In FIGS. 5, 6 and 7, arm 74 and surface 78 lie in one plane further from the viewer than another plane where arm 76 and surface 80 lie. In the one plane with arm 74 and surface 78 is arcuate pocket 82 that accommodates the curved end of arm 74 as arm 74 swings from its FIG. 5 position to its FIG. 6 position. Likewise, in the other plane with arm 76 and surface 80 is arcuate pocket 84 that accommodates the curved end of arm 76 as arm 76 swings from its FIG. 5 position to its FIG. 6 position. The curved ends of arms 74 and 76 are perhaps most clearly seen at 86 and 88 in FIG. 7. In their retracted positions, arms 74 and 78 preferably face on respective stop surfaces 90 and 92.

Figure 17:
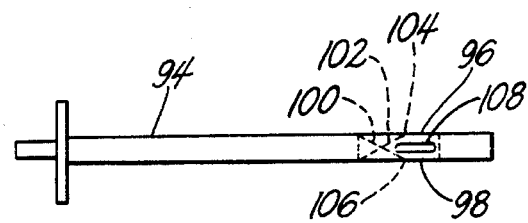
FIG. 17 is an unsectioned side elevational view of the plunger of second embodiment of the fastener.

Inside fastener 64, plunger 94 translatably and closely fits with barrel 12, plunger 94 being shown alone in FIG. 17. In FIG. 17, the fore end of plunger 94 has two flat trapezoidal slot-like voids 96 and 98, these voids having arm engagement surfaces 100 and 102. Surfaces 100 and 102 are respectively coplanar with arm 74 and arm 76, and respectively have leading edges 104 and 106, which appear as points in FIGS. 5, 6, 7 and 17.

Intersecting slot-like voids 98 and 98 is elongate oval slot 108 which accommodates pin 72 as plunger 94 translates in barrel 66. When plunger 94 translates forward from its FIG. 5 position, edges 104 and 106 advance into contact with arms 74 and 76. Edges 104 and 106 then swing arms 74 and 76 to the FIG. 6 position where stop surface 100 (FIG. 7) is faced with arm 74 and stop surface 102 (FIG. 7) is faced with arm 76. In FIG. 6, these stop surfaces resist swing of the arms in both the counterclockwise and clockwise directions. Stop surfaces 90 and 92 of barrel 66 also resist rotation of the arms, surface 90 preventing clockwise rotation of arm 74 and surface 92 preventing counterclockwise rotation of arm 76. One may eliminate stop surfaces 90 and 92, so that surfaces 100 and 102 alone resist the arms' rotation. When plunger 94 advances from the FIG. 5 position toward the FIG. 6 position, edges 104 and 106 swing arms 74 and 74 from their FIG. 5 position to their FIG. 6, deployed position.

At the aft end of plunger 94 are a stud 110 and a back plate 112. Compressed between plate 112 and fore wall 114 of container 68 is coil spring 70 biasing plunger 94 aft toward container 68 and biasing arms 74 and 76 toward their FIG. 5 position transverse of the plunger. Pushing in stud 110 advances plunger 94 to rotate arms 74 and 76 from their FIG. 5 deployed position to their FIG. 6, retracted position. When plunger 66 translates from the FIG. 6 position to the FIG. 5 position, corners 122 and 124 (FIG. 7) engage and then rotate arms from the arms' retracted position to their deployed (FIG. 5) position.

Optionally, bow springs 116 can be fixed at 118 to barrel 66 and can extend to buttons 120 (FIG. 7) on the arms, springs 116 being in the free state in FIG. 6. If fastener 64 is inserted in a hole whose diameter is larger than that of barrel 66, springs 116 take up the play or slack between the inner peripheral surface of the hole and barrel 66, whereby fastener 64 is snugly fit with the hole. Relative movement between members held together by fastener 64, such as members 56 and 58 in FIG. 4, are thus inhibited from motion relative to one another or and are also inhibited from motion relative to fastener 64.

Figure 15:
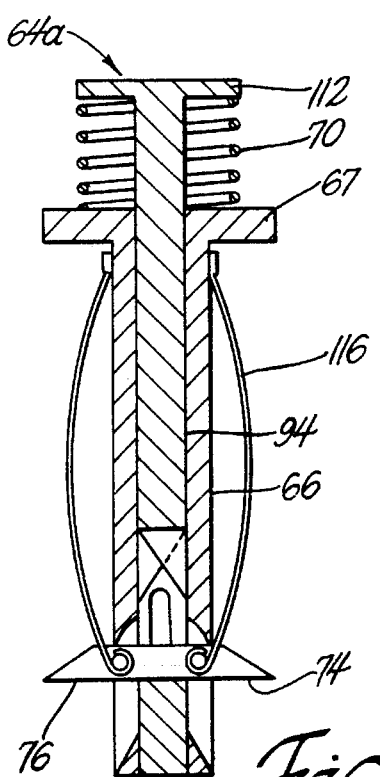
FIG. 15 is a sectioned side elevational of an optional modification to the second embodiment of my fastener.

An optional modification to fastener 64 is shown as fastener 64a in FIG. 15, the elements common to fasteners 64 and 64a having the same reference numbers. The modification consists of eliminating stud 110 and replacing container 68 with circular flange 67. Spring 70 is fixed at one end to back wall 112 and is fixed at the other end to flange 67.

Figure 8:
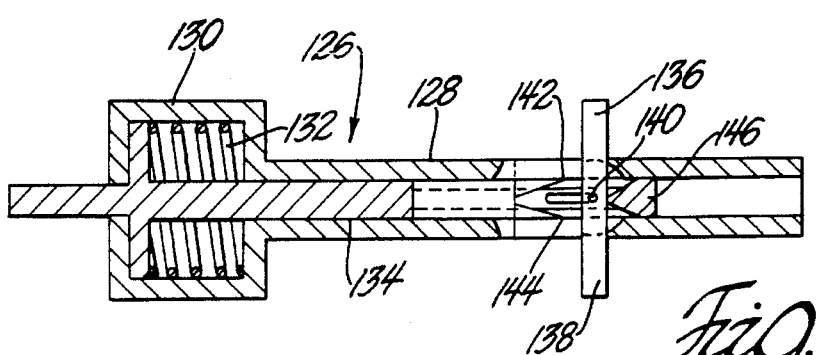
FIG. 8 is a sectioned side elevational view of a third embodiment of the fastener in a deployed configuration.

A third embodiment 126 of the fastener is shown in FIG. 8, fastener 128 being essentially the same as fastener 64 except that the arms swing forward to deploy, not backward like the arms of fastener 64. Fastener 126 has a tube-like barrel 128 and a container 130 enclosing a spring 132 which biases plunger 134 left toward container 130 in FIG. 8. When plunger 134 translates to the right from its FIG. 8 position, plunger edge 142 swings arm 138 clockwise and plunger edge 144 swings arm 136 counterclockwise, so that the arms pivot to positions flush with the outer periphery of barrel 128. Later, arms 136 and 138 can be swung on pin 140 to the FIG. 8, deployed position by leftward plunger motion wherein tapered block 146 swings arm 136 clockwise and swings arm 138 counterclockwise.

Figure 13:
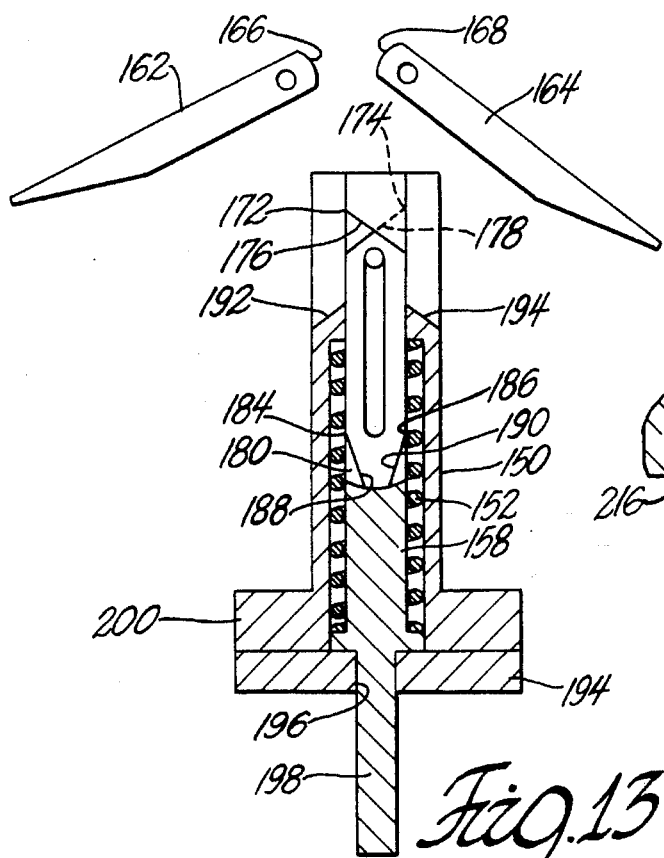
FIG. 13 is a sectioned side elevational view of the barrel and aft portion of the fourth embodiment, the arms shown separated from the barrel in the figure.

A fourth embodiment 148 of the fastener is shown by FIGS. 11, 12 and 13, wherein the fastener includes a barrel 150 having coil spring 152 coaxially seated therein. Spring 152 is compressed between annular flange 154 of plunger 158 and internal shoulder 156 of barrel 150. At the forward end of barrel 150 is pivot pin 160 on which swing arms 162 and 164, arm 162 having curved end 166 (FIG. 12) and arm 164 having curved end 168. Note that in FIG. 11, arms 162 and 164 are in a retracted position even though they extend slightly forward of barrel 150 and plunger 158. Note, too, in FIG. 11 that no part of arms 162 or 164 is further from the fastener's central axis 192 than the outside of barrel 150, whereby the minimum hole width in which fastener 148 fits is determined by barrel 150 and not by the arms' retracted position. End plate 194 is affixed to the aft end of barrel 150 at step 200 and defines an aperture 196 through which passes a stud 198 that forms part of plunger 158. In FIG. 12, arms 162 and 164 are biased via spring 152 and plunger 158 so that their tapered free ends 163 and 165 are closer to end plate 194 at the aft of the plunger than their curved ends.

Plunger 158 defines a forward concavity 170 that accommodates curved ends 166 and 168 as arms 162 and 164 rotate. Extending from concavity 170 is tooth 180 coplanar with arm 162, tooth 180 having forward edge 184 that rotates arm 162 clockwise as plunger 158 advances from the FIG. 11 position to the FIG. 12 position. Likewise extending from concavity 170 is tooth 182 coplanar with arm 164, tooth 182 having forward edge 186 that rotates arm 164 counterclockwise as plunger 158 advances from the FIG. 11 position to the FIG. 12 position. The teeth have engagement surfaces 188 and 190 that bear against arms 162 and 164 in FIG. 11 to limit rotation of the arms as plunger 158 advances. At the fore end of plunger 158 is engagement surface 176 coplanar with arm 164 and engagement surface 178 coplanar with arm 162. When plunger 158 translates with the bias of spring 152, edge 172 of surface 176 pushes arm 162 counterclockwise from the arm's retracted, FIG. 11 position to the arm's deployed, FIG. 12 position. At the same time, edge 174 of surface 178 pushes arm 164 clockwise from that arm's retracted, FIG. 11 position to that arm's deployed, FIG. 12 position. Surfaces 176 and 178 limit rotation of arms 162 and 164 as the arms approach their deployed position and optionally stop surfaces 192 and 194 of barrel 150 can also limit such rotation.

Figure 14:
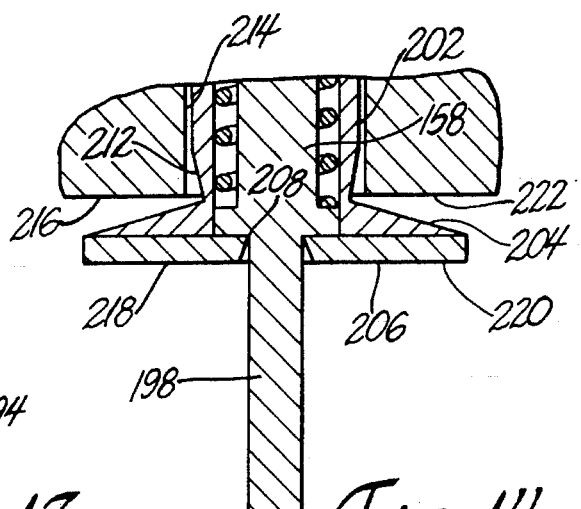
FIG. 14 is a sectioned detail showing an optional modification to the fourth embodiment.

FIG. 14 shows an optional modification to the embodiment of the fastener shown in FIGS. 11, 12 and 13. In FIG. 14 barrel 150 is replaced by barrel 202, which defines a flexible neck 212, and tapered annular flange 204 replaces step 200. A flexible plate 206 is attached to flange 204 and interferingly engages stud 198 by means of circular edge 208. When force toward member 216 is applied to outer peripheral zones 218 and 220 of plate 206, flange 204 moves toward, and possibly into, face-to-face engagement with surface 222 of member 216 in which the fastener is inserted. The flexing of plate 206 moves edge 208 away from stud 198 so that stud 198 can move relative to plate 206 and flange 204. Once the aforementioned force ceases, edge 208 again engages stud 198 to lock stud 198 in place relative to flange 204 and plate 206. As a consequence, plate 206 can be used to lock plunger 150 and arms 162 and 164 in a chosen configuration.

I wish it to be understood that I do not desire to be limited to the exact details of construction or method shown herein since obvious modifications will occur to those skilled in the relevant arts without departing from the spirit and scope of the following claims.

I claim:

1. A fastener for quick attachment of one member to another member, comprising:

a longitudinal axis;

an elongate barrel disposed along the longitudinal axis;

an outer surface of the barrel;

a plunger translatable in a forward and rear direction in the barrel;

a pivot pin in the barrel extending through the plunger;

a pivot axis of the pin fixed relative to the longitudinal axis;

an arm on the pin swung on the pivot axis between a retracted position where none of the arm is further than the outer surface from the longitudinal axis and a deployed position where the arm extends from the barrel;

means for biasing the arm toward the deployed position, the arm biasing means having a first arm engagement part of the plunger, the first arm engagement part being opposed to the arm and faced in the rear direction, the arm biasing means further having means to bias the plunger in the rear direction;

a second arm engagement part of the plunger opposed to the arm and faced in the forward direction.

2. A fastener for quick attachment of one member to another member, comprising:

a longitudinal axis of the fastener;

an elongate barrel disposed along the longitudinal axis;

an outer surface of the barrel;

a plunger translatable in a forward and rear direction in the barrel, and closely fit in the barrel;

a pivot pin in the barrel extending through the plunger;

a pivot axis in the pin fixed relative to the longitudinal axis;

an arm on the pin pivotable on the pivot axis between a forward swing position where no part of the arm is further than the outer surface from the longitudinal axis and a second swing position where the arm extends out from the barrel;

means for biasing the arm toward the second position, wherein the arm biasing means includes a first arm engagement part of the plunger opposed to the arm and faced in the rear direction and wherein the arm biasing means includes means to bias the plunger in the rear direction;

a second arm engagement part of the plunger axially opposed to the arm and faced in the forward direction.

3. The fastener of claim 2 wherein the first engagement part comprisies means for resisting arm rotation in either direction about the pivot axis during the second position, the resisting means comprising a surface of the plunger oblique to the longitudinal axis.

4. The fastener of claim 2 further wherein the second engagement part comprisies means for resisting arm rotation in either direction about the pivot axis during the forward position, the resisting means comprising an engagement face of the plunger oblique to the longitudinal axis.

5. The fastener of claim 2 further comprising:

a free end of the arm;

an aft end of the fastener;

wherein the free end is closer to the aft end during the arm's second swing position.

6. The fastener of claim 2 further comprising:

an aft end of the fastener;

a stud fixed to the plunger passing through the aft end;

means for releasably fixing the stud to the aft end, the fixing means comprising a flexible plate fastened to the aft end and an edge of the plate interferingly engaging the stud.

7. A fastener for quick attachment of one member to another member, comprising:

a longitudinal axis of the fastener;

an elongate barrel disposed along the longitudinal axis;

an exterior surface of the barrel;

a plunger translatable in a forward and rear direction in the barrel;

the plunger defining a flat trapezoidal slot therethrough and an elongate slot intersecting the trapezoidal slot;

a pivot pin in the barrel extending through the elongate slot;

a pivot axis in the pin fixed relative to the longitudinal axis;

an arm on the pin pivotable on the pivot axis between a retracted swing position where no part of the arm is further than the exterior surface from the longitudinal axis and a deployed swing position where the arm extends out from the barrel.

8. The fastener of claim 7, further comprising:

means for biasing the arm toward the deployed position, wherein the arm biasing means includes a first arm engagement part of the plunger opposed to the arm and faced in the rear direction and and the arm biasing means includes means to bias the plunger in the rear direction.

9. The fastener of claim 8 further comprising:

a stop surface of the barrel opposed to the arm for stopping rotation of the arm from the retracted position past the deployed position;

two ends of the arm extending from the barrel in the deployed position.

* * * * *